US006806737B2

(12) United States Patent
Sung et al.

(10) Patent No.: US 6,806,737 B2
(45) Date of Patent: Oct. 19, 2004

(54) BI-DIRECTIONAL AMPLIFIER AND METHOD FOR ACCELERATED BUS LINE COMMUNICATION

(76) Inventors: Raymond Jit-Hung Sung, 7212 Avalon Dr., Wilmington, MA (US) 01887; John Conrad Koob, 11135-83 Avenue #910, Edmonton, AB (CA), T6G 2C6; Tyler Lee Brandon, 205 Kingfisher Bay, Sherwood Park, AB (CA), T8A 3MI; Duncan George Elliot, 346 Burton Rd., Edmonton, AB (CA), T6R 2J5

( * ) Notice: Subject to any disclaimer, the term of this patent is extended or adjusted under 35 U.S.C. 154(b) by 25 days.

(21) Appl. No.: 10/395,318

(22) Filed: Mar. 21, 2003

(65) Prior Publication Data

US 2003/0179012 A1 Sep. 25, 2003

Related U.S. Application Data

(60) Provisional application No. 60/365,805, filed on Mar. 21, 2002.

(51) Int. Cl.[7] .............................................. H03K 19/096
(52) U.S. Cl. ............................ 326/98; 326/95; 326/121; 327/208
(58) Field of Search ................................ 326/93, 95, 98, 326/121; 327/208–212, 214, 215, 224, 225

(56) References Cited

U.S. PATENT DOCUMENTS

| | | | |
|---|---|---|---|
| 3,769,525 A | * 10/1973 | Foss et al. ..................... 326/90 |
| 5,148,047 A | 9/1992 | Spohrer | |
| 5,148,547 A | 9/1992 | Kahle et al. | |
| 5,321,510 A | 6/1994 | Childers et al. | |
| 5,450,603 A | 9/1995 | Davies | |
| 5,455,528 A | 10/1995 | Partovi et al. | |
| 5,546,343 A | 8/1996 | Elliott et al. | |
| 5,565,796 A | 10/1996 | Nakase | |
| 5,661,417 A | * 8/1997 | Kondoh ........................ 326/87 |
| 5,956,274 A | 9/1999 | Elliott et al. | |
| 6,046,608 A | * 4/2000 | Theogarajan ................ 326/121 |
| 6,150,846 A | 11/2000 | Sakamoto | |
| 6,279,088 B1 | 8/2001 | Elliott et al. | |
| 6,356,115 B1 | * 3/2002 | Dabral et al. .................. 326/86 |
| 6,686,774 B1 | * 2/2004 | Soni ............................. 326/86 |
| 2001/0053105 A1 | 12/2001 | Elliott et al. | |

OTHER PUBLICATIONS

Paik, W., et al., "Low power logic design using push–pull pass–transistor logics," *Int. J. Electronics*, 84(5):467–478, (1998).

Partovi, H. and Draper, D., "A Regenerative Push–Pull Differential Logic Family," in *Proc. IEEE Int. Solid–State Circuits Conf.*, pp. 294–295; 356, (1994).

(List continued on next page.)

*Primary Examiner*—Vibol Tan
(74) *Attorney, Agent, or Firm*—Hamilton, Brook, Smith & Reynolds, P.C.

(57) ABSTRACT

A circuit and method for accelerating bus line communication in an integrated circuit is disclosed. High speed transmission of signals along a bus line is achieved by driving a series of bus line segments with their own bi-directional bus amplification circuits. Because each bus line segment has less capacitive loading than longer non-segmented bus lines, voltage reversal, or data inversion of a pair of complementary lines of a bus line segment is accomplished at high speed. Each bi-directional bus amplification circuit includes a precharge circuit for precharging each complementary pair of lines to known logic levels, and a drive circuit for changing the logic level of each line. The bi-directional bus amplification circuit of the present invention logically connects two lines to each other while actively amplifying the signal in either direction without prior knowledge of which direction the signal must be driven, and without additional control overhead than that required for a conventional precharged bus line.

25 Claims, 11 Drawing Sheets

OTHER PUBLICATIONS

Elliott, D.G., et al., "Computational RAM: Implementing Processors in Memory," *IEEE Design & Test of Computers*, pp. 32–41 (1999).

Childers, J. and Reinecke, P., "Serial Video Processor," *IEEE Custom Integrated Circuits Conference* pp. 17.3.1–17.3.4 (1990).

Yamashita, N., et al., "A 3.84 GIPS Integrated Memory Array Processor with 64 Processing Elements and a 2-Mb SRAM," *IEEE Journal of Solid-State Circuits* 29(11):1336–1343 (1994).

Kimura, T., et al., "Design of 1.28–GB/s High Bandwidth 2-Mb SRAM for Integrated Memory Array Processor Applications," *IEEE Journal of Solid-State Circuits* 30(6):637–643 (1995).

Gealow, J.C. and Sodini, C.G., "A Pixel-Parallel Image Processor Using Logic Pitch-Matched to Dynamic Memory," *IEEE Journal of Solid-State Circuits* 34(6):831–839 (1999).

Yamashita, H. and Sodini, C.G., "A 128×128 CMOS Imager with 4×128 Bit-Serial Column-Parallel PE Array," in *Proc. IEEE Int. Solid-State Circuits Conf.*, pp. 96–97 (2001).

\* cited by examiner

BI-DIRECTIONAL AMPLIFIER AND METHOD FOR ACCELERATED BUS LINE COMMUNICATION

This application claim priority from U.S. Application No. 60/365,805 filed Mar. 21, 2002.

FIELD OF THE INVENTION

The present invention relates to Very Large Scale Integrated (VLSI) circuit accelerated bus line communication. In particular, the present invention relates to bus amplification circuits.

BACKGROUND OF THE INVENTION

Highly integrated circuits such as microprocessors, application specific integrated circuits (ASICs) and some memory devices utilize bus lines for the communication of data between at least two points. In memory devices for example, data buses are used to carry data from the memory core to input/output pads. In microprocessors and ASICs, buses are commonly used to carry information to various blocks within the chip. Data buses can be uni-directional, where data is always transmitted in one direction, or bi-directional, where data can be transmitted in either direction. In both types however, the speed at which data is transmitted along the data bus can limit the overall performance of the integrated circuit.

Another type of integrated circuit device that makes use of bus lines is computational random access memory (CRAM). CRAM is a memory device having arrayed parallel processors with hundreds to thousands of processors commonly connected to a shared bus line. CRAM is a processor in memory architecture that takes advantage of the large internal memory bandwidth available at the sense amplifiers. By pitch matching each bit serial processing element (PE) to one or more memory columns, CRAM can operate as a massively parallel single instruction stream, multiple data stream (SIMD) computer. CRAM architectures and arrayed parallel processor architectures are well known in the art.

An example of a prior art CRAM is shown in FIG. 1. The CRAM 20 shown in FIG. 1 includes two banks 22 and 24, labeled "Bank 1" and "Bank 2" respectively, although a CRAM can contain any number of banks. Bank 22 includes a memory array 26 coupled to peripheral circuits such as row decoders 28, processing elements (PEs) 30, and column decoders 32. Bank 24 is identically configured to bank 22, and includes a memory array 34 coupled to peripheral circuits such as row decoders 36, PEs 38, and column decoders 40. Memory arrays 26 and 34 can be of any type of memory, such as dynamic random access memory (DRAM) or static random access memory (SRAM), for example, with row decoders 28 and column decoders 32 selecting particular memory cells for read and write operations. Each PE 30 has direct access to a single column of memory for use as its local memory, and is coupled to a common broadcast bus 42. As shown in FIG. 1, PEs 30 and 38 are all coupled to the same broadcast bus 42, which can further extend to other banks of the chip. The PEs 30 are connected to the common broadcast bus 42 in a wired AND configuration, allowing the common broadcast bus 42 to function as a dynamic zero detect circuit. Furthermore, if at least one PE 30 writes a zero to the common broadcast bus 42, all other PEs 30 receive the zero value for register write back.

An example of a prior art PE 30 or 38 used in CRAM 20 of FIG. 1 is shown in FIG. 2. A pair of adjacent PEs 30 are shown in FIG. 2, illustrating the interconnections between each other and the broadcast bus 42. The presently shown PEs 30 support bit-serial computation, left-right nearest-neighbor communication, wired-AND broadcast bus evaluation and external databus access. The data processing components of PEs 30 are not relevant to the present invention and hence not discussed in detail, except for transceivers 50 which are responsible for communicating data between the PE 30 and the broadcast bus 42. The memory can also be accessed externally through a conventional databus 52 connected to sense amplifier circuit 54.

Because the broadcast bus 42 is long, and is capacitively loaded due to the numerous transceivers 50 connected to it, global communication between PEs 30 via the wired AND broadcast bus line is slow. As is known to those of skill in the art, factors that limit bus speed performance are its capacitive load and wiring resistance, both of which increase in proportion to its wiring density and length. The capacitive load of the bus also increases as more transistors, such as transceivers 50, are coupled to it.

Hence, the switching rate and the time to reverse bus line charge are degraded and overall performance is adversely affected. Unfortunately, maximum device performance demands that charge reversal of the bus line be completed within the shortest time possible while taking into account adequate noise margins while ensuring reliable data recognition.

The circuits and techniques proposed in the art for improving bus line performance include mid-point precharge schemes, sensing of small voltage changes, segmenting bus lines, and other various schemes for reducing bus line capacitance or speeding up signal transmission. Unfortunately, many of the proposed solutions are not suitable for bi-directional signal transmission since their circuits require control signals to indicate the direction of the data. This can add design overhead and impose control signal timing constraints.

It is, therefore, desirable to provide a bus amplifier circuit and method for providing high-speed operation of a bi-directional bus line.

SUMMARY OF THE INVENTION

It is an object of the present invention to obviate or mitigate at least one disadvantage of previous bi-directional bus line amplifier circuits and methods. In particular, it is an object of the invention to provide a high-speed bi-directional bus line architecture.

In a first aspect, the present invention provides a bi-directional amplifier circuit for driving data between first and second complementary bus lines and third and fourth complementary bus lines. The bi-directional amplifier circuit includes a precharge circuit, a pre-discharge circuit, discharge circuit, and a charge circuit. The precharge circuit charges the first bus line to a high logic level. The pre-discharge circuit discharges the second bus line to a low logic level. The discharge circuit drives the first bus line to the low logic level in response to a change in the logic level of one of the second bus line and the fourth bus line. The charge circuit drives the second bus line to the high logic level in response to a change in the logic level of one of the first bus line and the third bus line.

In an embodiment of the present aspect, an enable signal activates the discharge circuit and disables the pre-discharge circuit, and an inverted enable signal activates the charge circuit and disables the discharge circuit. The precharge circuit includes a p-channel transistor having a gate terminal for receiving the enable signal, and the pre-discharge circuit includes an n-channel transistor having a gate terminal for receiving the inverted enable signal.

According to an aspect of the present embodiment, the discharge circuit includes a first discharge transistor for discharging the first bus line to the low logic level in response to the high logic level of the fourth bus line, and the charge circuit includes a first charge transistor for charging the second bus line to the high logic level in response to the low logic level of the third bus line. In the present aspect, the discharge circuit includes second and third discharge transistors serially connected between the first bus line and VSS, where the second discharge transistor has a gate terminal for receiving the second bus line, and the third discharge transistor has a gate terminal for receiving the enable signal. The charge circuit includes second and third charge transistors serially connected between the second bus line and VDD, where the second charge transistor has a gate terminal for receiving an inverted enable signal, and the third charge transistor has a gate terminal for receiving the first bus line.

In an alternate embodiment of the present aspect, the discharge circuit includes a second discharge transistor connected between the first bus line and the enable signal, and the second discharge transistor has a gate terminal for receiving the second bus line. The charge circuit includes a second charge transistor connected between the second bus line and the inverted enable signal, and the second charge transistor has a gate terminal for receiving the first bus line.

In yet another embodiment of the present aspect, a first keeper transistor has a gate terminal connected to the second bus line for coupling VDD to the first bus line, and a second keeper transistor has a gate terminal connected to the first bus line for coupling the second bus line to VSS.

In another embodiment of the present aspect, multiple discharge and charge circuits are coupled to the first and second bus lines.

In a second aspect, the present invention provides a bi-directional amplifier circuit for driving data between first and second complementary bus lines, and third and fourth complementary bus lines, where the first and third bus lines are precharged to a first predetermined logic level and the second and fourth bus lines are precharged to a second predetermined logic level. The bi-directional amplifier circuit includes a first local bi-directional amplifier circuit coupled to the first and second complementary bus lines for receiving the third and fourth complementary bus lines, and a second local bi-directional amplifier circuit coupled to the third and fourth complementary bus lines for receiving the first and the second bus lines. The first local bi-directional amplifier circuit accelerates charge reversal of the first and second complementary bus lines in response to a change in the logic levels of one of the third and fourth complementary bus lines and the first and second complementary bus lines. The second local bi-directional amplifier circuit accelerates charge reversal of the third and fourth complementary bus lines in response to a change in the logic levels of one of the first and second complementary bus lines and the third and fourth complementary bus lines.

According to an embodiment of the present aspect, the first local bi-directional amplifier circuit includes a precharge circuit, a pre-discharge circuit, a discharge circuit and a charge circuit. The precharge circuit precharges the first bus line to the first predetermined logic level. The pre-discharge circuit precharges the second bus line to the second predetermined logic level. The discharge circuit drives the first bus line to the second predetermined logic level in response to a change in the logic level of one of the second bus line and the fourth bus line. The charge circuit drives the second bus line to the first predetermined logic level in response to a change in the logic level of one of the first bus line and the third bus line.

In an aspect of the present embodiment, the precharge circuit includes a p-channel transistor having a gate terminal for receiving the enable signal, and the pre-discharge circuit includes an n-channel transistor having a gate terminal for receiving an inverted enable signal. The discharge circuit can include a first discharge transistor for discharging the first bus line to the low logic level in response to the high logic level of the fourth bus line. The charge circuit can include a first charge transistor for charging the second bus line to the high logic level in response to the low logic level of the third bus line.

According to another aspect of the present embodiment, the discharge circuit cam include second and third discharge transistors serially connected between the first bus line and VSS. The second discharge transistor has a gate terminal for receiving the second bus line and the third discharge transistor has a gate terminal for receiving the enable signal. The charge circuit includes second and third charge transistors serially connected between the second bus line and VDD. The second charge transistor has a gate terminal for receiving the inverted enable signal, and the third charge transistor has a gate terminal for receiving the first bus line.

In yet another aspect of the present embodiment, a first keeper transistor has a gate terminal connected to the second bus line for coupling VDD to the first bus line, and a second keeper transistor has a gate terminal connected to the first bus line for coupling the second bus line to VSS.

In a third aspect, the present invention provides a method of bi-directionally driving data between first and second complementary bus lines and third and fourth complementary bus lines. The method includes precharging the first and third complementary bus lines to a first predetermined logic level, precharging the second and fourth complementary bus lines to a second predetermined logic level, changing the first precharged bus line to the second predetermined logic level in response to a change in the logic level of one of the second bus line and the fourth bus line, and changing the second precharged bus line to the first predetermined logic level in response to a change in the logic level of one of the first bus line and the third bus line.

In embodiments of the present aspect, the step of precharging includes precharging the first and third bus lines to the high logic level, and pre-discharging the second and fourth bus lines to the low logic level. The step of precharging is initiated by an inactive level of an enable signal. The step of discharging and charging is initiated by an active level of the enable signal.

In a fourth aspect, the present invention provides a computational random access memory having a plurality of memory columns. The computation random access memory includes processing elements, a complementary pair of sub-broadcast bus lines, a complementary pair of short broadcast bus lines, and a bi-directional bus amplifier circuit. The processing elements are associated with the memory columns for executing computational functions. The complementary pair of sub-broadcast bus lines receive input data from processing elements and provide output data to the processing elements. The complementary pair of short broadcast bus lines receive the input data from the complementary pair of sub-broadcast bus lines and provide the output data to the complementary pair of sub-broadcast bus lines. The bi-directional bus amplifier circuit accelerates charge reversal of the complementary pairs of sub-broadcast bus lines and short broadcast bus lines.

In an embodiment of the present aspect, each processing element includes a transceiver circuit for providing the input data to the complementary pair of sub-broadcast bus lines and receiving the output data from the complementary pair of sub-broadcast bus lines. The transceiver circuit can include a receive circuit and a transmit circuit. The receive circuit receives the input data from one sub-broadcast bus line of the complementary pair of sub-broadcast bus lines. The transmit circuit drives the complementary pair of sub-broadcast bus lines with the output data.

In an aspect of the present embodiment, the receive circuit can include a first NAND gate having one input connected to the one sub-broadcast bus line and a second input for receiving an enable signal. The transmit circuit can further include a second NAND gate and a drive circuit. The second NAND gate has one input for receiving the enable signal and a second input for receiving the output data, for providing an activation signal. The drive circuit drives the complementary pair of sub-broadcast bus lines to complementary logic levels corresponding to the output data in response to the activation signal. The drive circuit can further include an, inverter for receiving the activation signal and providing an inverted activation signal, a p-channel transistor for coupling the one sub-broadcast bus line to VDD in response to the activation signal, and an n-channel transistor for coupling the other sub-broadcast bus line to VSS in response to the inverted activation signal.

BRIEF DESCRIPTION OF THE DRAWINGS

Embodiments of the present invention will now be described, by way of example only, with reference to the attached Figures, wherein.

DETAILED DESCRIPTION OF THE INVENTION

A circuit and method for accelerating bus line communication in an integrated circuit is disclosed. High-speed transmission of signals along a bus line is achieved by driving a series of bus line segments with their own bi-directional bus amplification circuits. Because each bus line segment has less capacitive loading than longer non-segmented bus lines, voltage reversal, or data inversion of a pair of complementary lines of a bus line segment is accomplished at high speed. Each bi-directional bus amplification circuit includes a precharge circuit for precharging each complementary pair of lines to known logic levels, and a drive circuit for changing the logic level of each line. The bi-directional bus amplification circuit of the present invention logically connects two lines to each other while actively amplifying the signal in either direction without prior knowledge of which direction the signal must be driven, and without additional control overhead than that required for a conventional precharged bus line.

According to the embodiments of the present invention, the complementary pair of bus lines are precharged to complementary predetermined logic levels when disabled, and when enabled, the bi-directional amplifier circuits reverse the charge of the complementary pair of bus lines if the data to be driven is opposite in logic level to the precharged level. Therefore the precharged logic level communicates one data value while the reversed logic level communicates a second data value.

Figure 1:
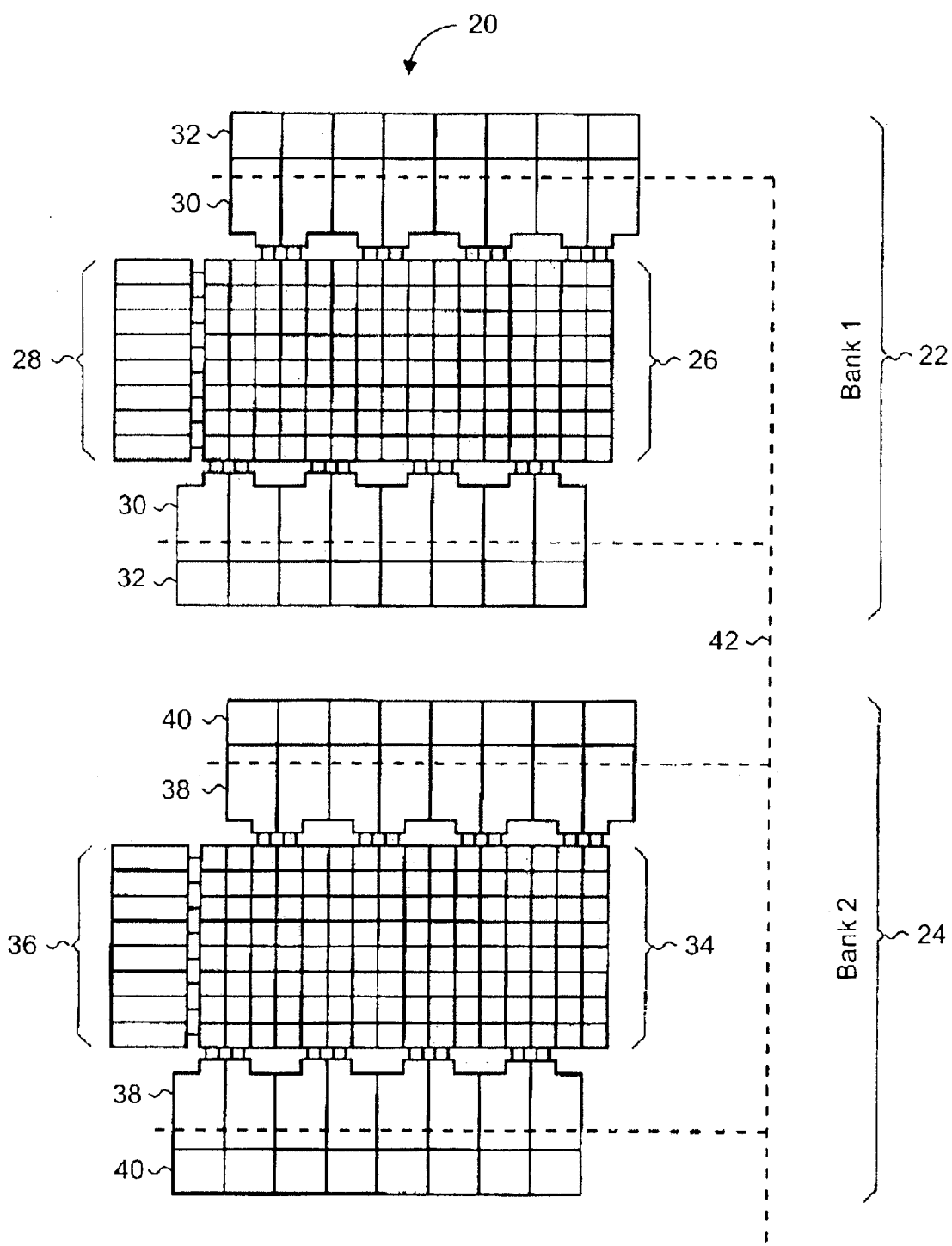
FIG. 1 is a block diagram showing a prior art CRAM architecture.
Figure 2:
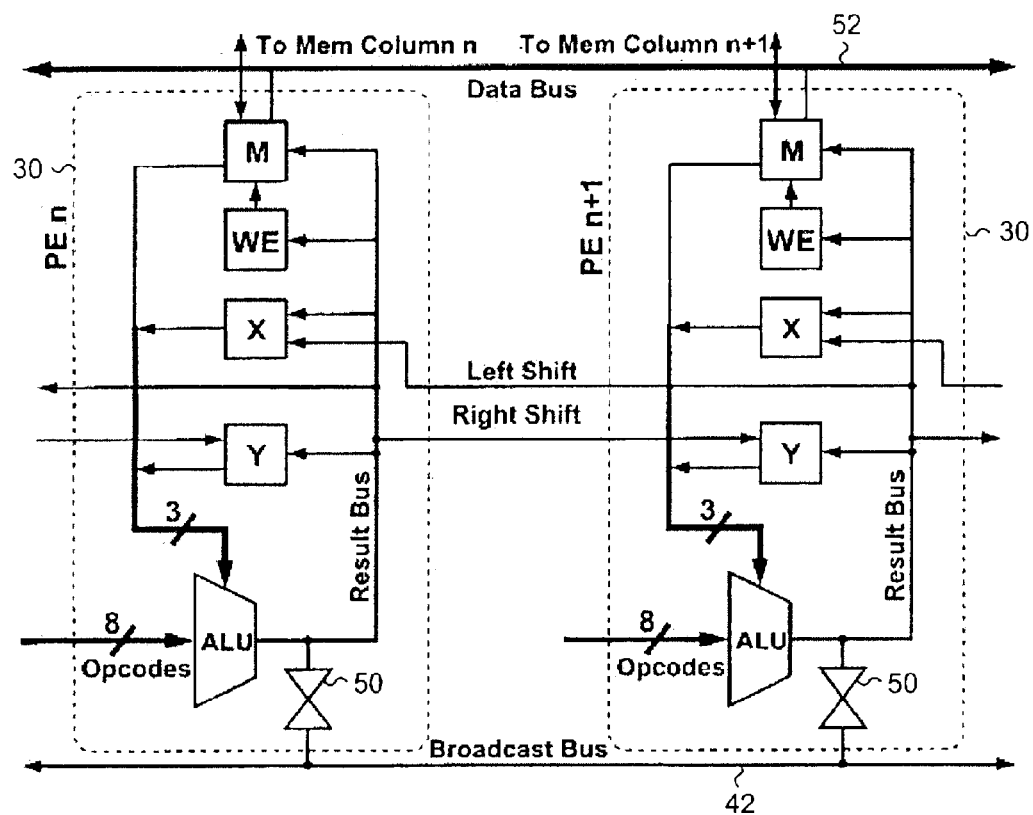
FIG. 2 is a block diagram showing details of the processing elements shown in FIG. 1.
Figure 3:
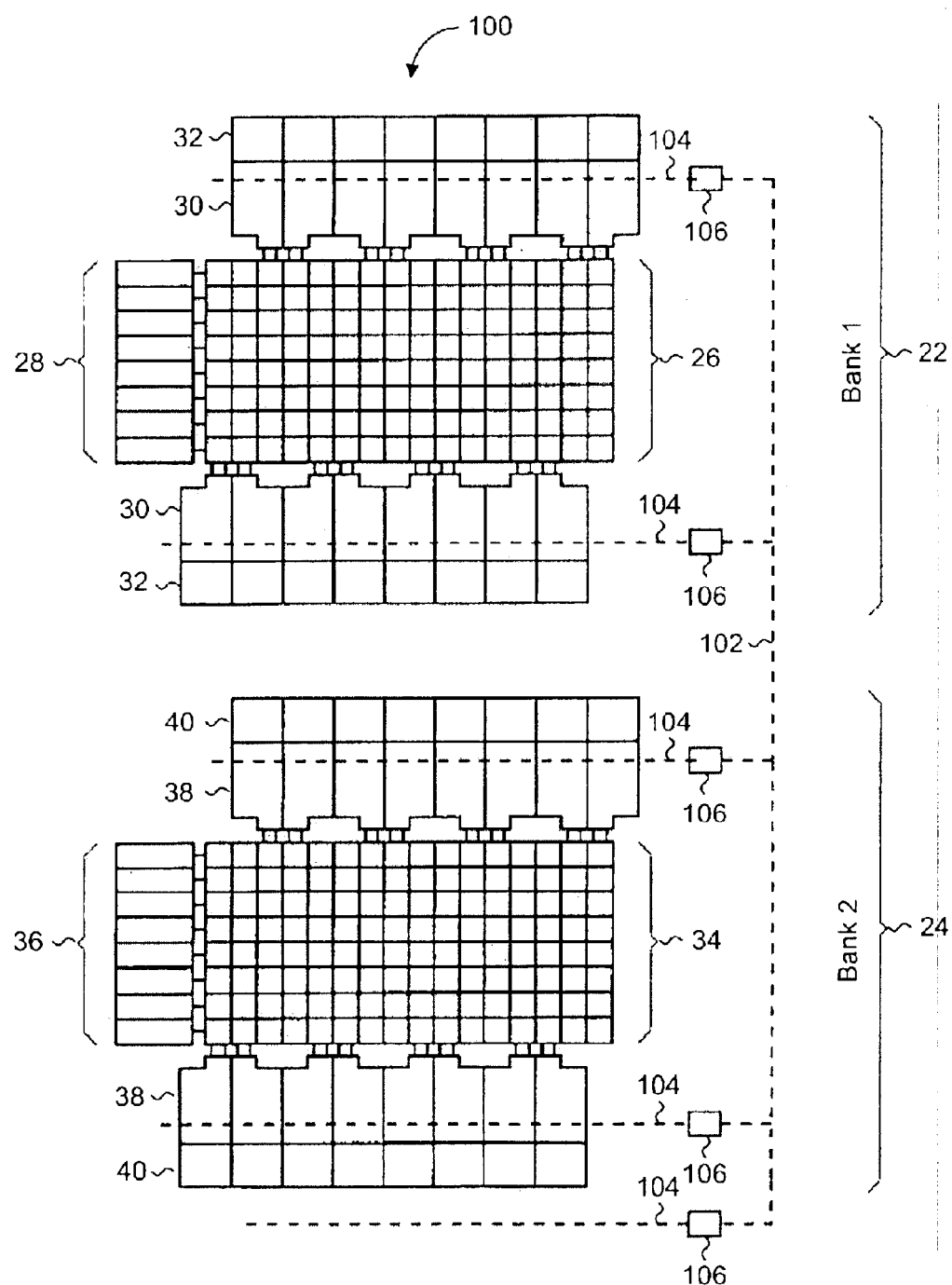
FIG. 3 is a block diagram showing a bus line architecture according to an embodiment of the present invention.
Figure 9:
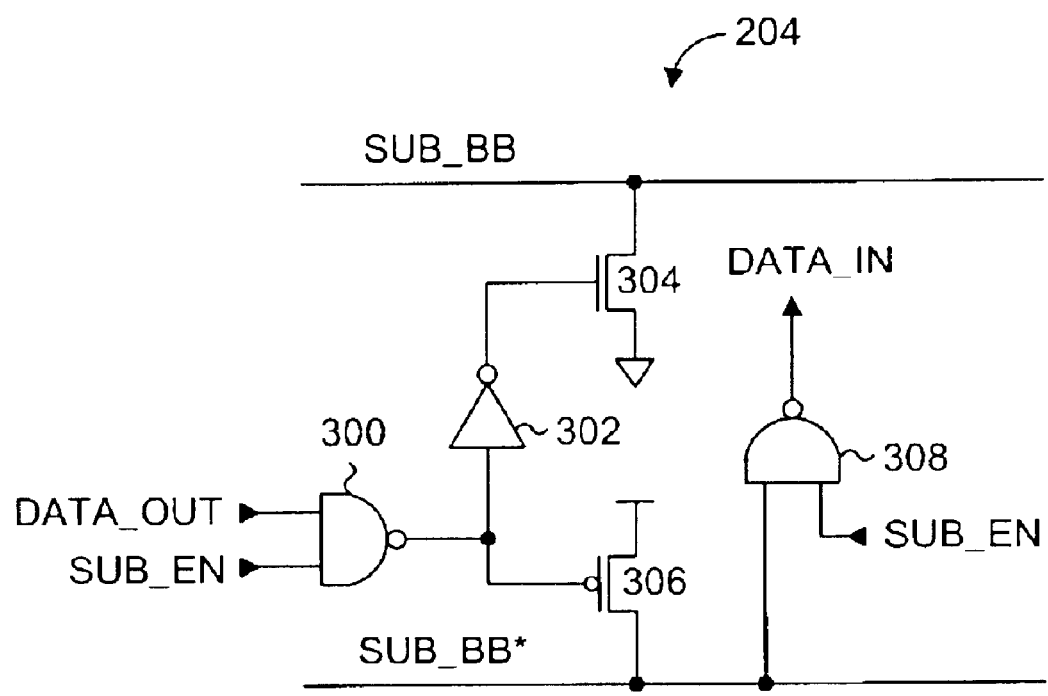
FIG. 9 is a circuit schematic of a bus transceiver circuit according to an embodiment of the present invention.
Figure 10:
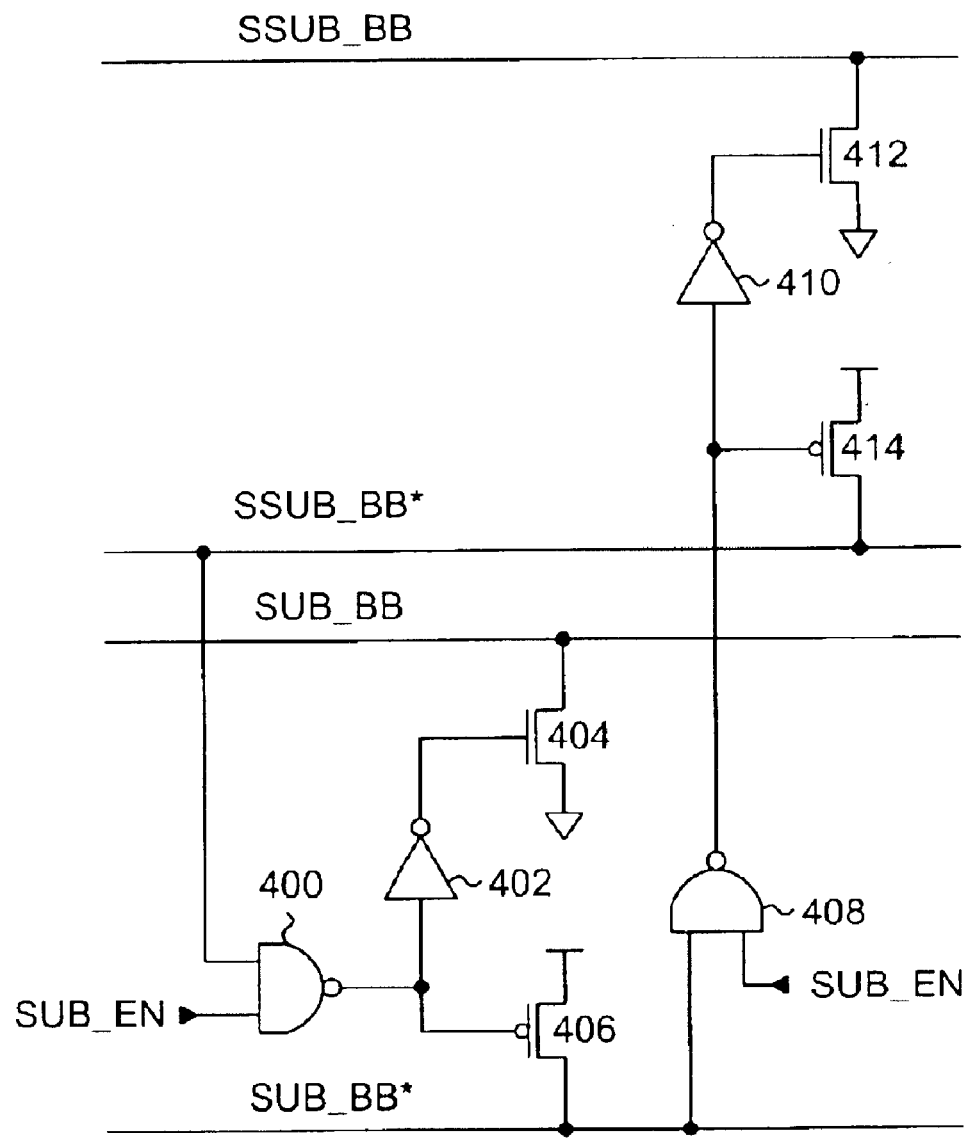
FIG. 10 is a circuit schematic of an alternative bus transceiver circuit according to an embodiment of the present invention; and, FIG. 11 is a circuit schematic of an interface circuit according to an embodiment of the present invention.

FIG. 3 is a block diagram illustrating a high-speed bi-directional bus line architecture for CRAM according to an embodiment of the present invention. CRAM 100 is similar to CRAM 20 of FIG. 1, where the same numbered elements have been previously described. It is noted that the broadcast bus 42 of FIG. 1 is now divided into a hierarchy of smaller bus lines, one for each row of physically adjacent processors. A short broadcast bus 102 is coupled to several sub-broadcast buses 104 via bi-directional bus amplifier circuits 106. Transceiver circuits (not shown) of each PE 30 and 38 are designed to operate with the bi-directional directional bus amplifier circuits 106. Circuit schematics of transceiver circuits according to embodiments of the present invention are shown in FIGS. 9 and 10. It is noted that short broadcast busses 102 and sub-broadcast buses 104 shown in FIG. 3 have been shown as single lines to simplify the schematic, but represent pairs of complementary bus lines, as will be shown in FIG. 4.

In the high-speed bi-directional bus line architecture shown in FIG. 3, dividing a single long bus line into N line segments reduces the effective bus line capacitance by 1/N of its initial bus line capacitance. As will be shown later, the bus transceiver and the bi-directional bus amplifier circuits 106 are simple, area efficient, and do not introduce additional control complexity beyond that required for a conventional precharged bus line. In particular, the bi-directional bus amplifier circuits are simultaneously bi-directional and drive signals in either direction without prior knowledge of which direction the signal must be driven, thus further reducing control complexity.

Figure 4:
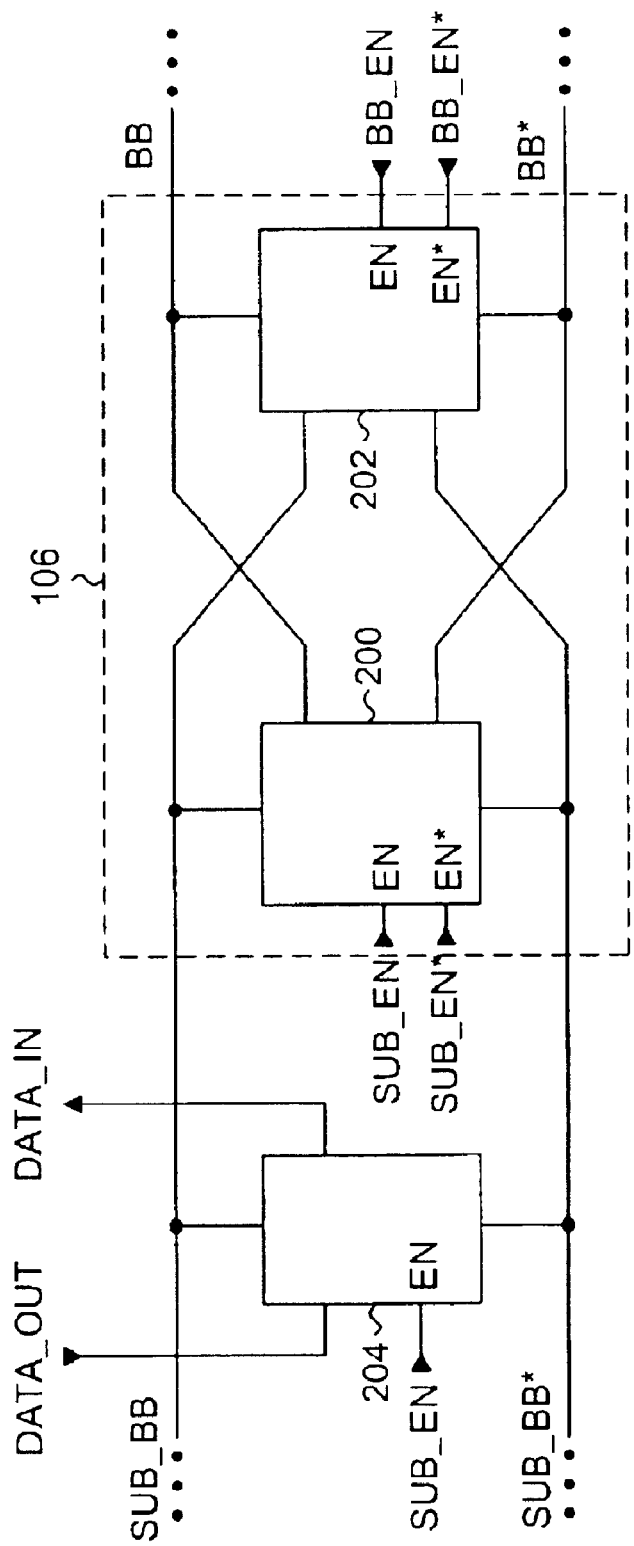
FIG. 4 is a block diagram showing the configuration of the bi-directional amplifiers shown in FIG. 3.

FIG. 4 is a block diagram showing the configuration of a bi-directional bus amplifier circuit 106 of FIG. 3 with a pair of complementary sub-broadcast bus lines SUB_BB and SUB_BB*, and a pair of complementary broadcast bus lines BB and BB*. With reference to FIG. 3, sub-broadcast bus lines SUB_BB and SUB_BB* are represented by sub-broadcast bus 104, and broadcast bus lines BB and BB* are represented by short broadcast bus 102. As shown in FIG. 4, bi-directional bus amplifier circuit 106 includes a first local bi-directional bus amplifier circuit 200 and a second local bi-directional bus amplifier circuit 202. First local bi-directional bus amplifier circuit 200 is coupled in parallel to the pair of complementary sub-broadcast bus lines SUB_BB and SUB_BB*, and receives the pair of complementary broadcast bus lines BB and BB* as inputs. Second local bi-directional bus amplifier circuit 202 is coupled in parallel to the pair of complementary broadcast bus lines BB and BB*, and receives the pair of complementary sub-broadcast bus lines SUB_BB and SUB_BB* as inputs. A transceiver circuit 204 of one PE is shown coupled in parallel to SUB_BB and SUB_BB* for transferring data between it and the PE circuits. Those of skill in the art will understand that there can be a plurality of PE circuits and corresponding transceiver circuits 204 coupled to SUB_BB and SUB_BB*. Local bi-directional bus amplifier circuits 200 and 202 receive complementary enable signals SUB_EN, SUB_EN* and BB_EN, BB_EN* respectively, while transceiver circuit 204 receives SUB_EN. Local bi-directional bus amplifier circuits 200 and 202 are preferably placed close to each other and near the ends of their respective bus lines.

In general operation, each local bi-directional bus amplifier circuit precharges its respective bus lines to predetermined complementary logic levels, such as logic "0" and "1" levels when SUB_EN is in an inactive low logic level. Those of skill in the art should understand that SUB_EN* is inactive at the high logic level. In the present embodiments, a VSS voltage level corresponds to a logic "0" level, and a VDD voltage level corresponds to a logic "1" level. Local bi-directional bus amplifier circuits 200, 202 and transceiver circuits 204 are set to the inactive state when SUB_EN is in the inactive state, such as a low logic level of "0", for example. Both local bi-directional bus amplifier circuits 200, 202 precharge their respective bus lines to logic levels having the same phase. More specifically, if SUB_BB and SUB_BB* are precharged to "1" and "0" levels respectively, then BB and BB* are precharged to "1" and "0" levels respectively.

Local bi-directional bus amplifier circuits 200, 202 and transceiver circuits 204 are activated when SUB_EN and BB_EN are driven to an active high logic level. Those of skill in the art should understand that SUB_EN* is active at the low logic level. In the present embodiment SUB_EN and BB_EN are distinct signals that are preferably activated at the same time, hence all local bi-directional bus amplifier circuits of the chip can receive the same complementary enable signals. In alternate embodiments, SUB_EN and BB_EN can be the same signal, and SU_EN* and BB_EN* can be generated locally with an inverter so that only one control signal is distributed across the device. If transceiver 204 drives data onto SUB_BB and SUB_BB* having logic levels that are the same as the precharged levels, then no charge reversal of SUB_BB and SUB_BB* is required, and accordingly, no charge reversal of BB and BB* is required either as the precharged logic levels become the present data levels. The same result holds true if data driven on BB and BB* to be received by transceiver 204 is the same as their precharged levels.

However, if data driven by transceiver 204 is opposite to the precharged levels, then charge reversal of SUB_BB and SUB_BB* commences. In the present example, SUB_BB and SUB_BB* precharged to the respective "1" and "0" levels are reversed, whereby the voltage level of SUB_BB is discharged towards VSS and the voltage level of SUB_BB* is charged towards VDD by the circuits of transceiver 204. Local bi-directional bus amplifier circuit 200 accelerates this charge reversal once its trip-point is reached. Because local bi-directional bus amplifier circuit 202 receives SUB_BB and SUB_BB*, it will also begin charge reversal of BB and BB* once its trip-point is reached. The reverse process occurs if charge reversal is initiated on BB and BB*. Hence, the local bi-directional bus amplifier circuits 200 and 202 can accelerate charge reversal of the bus lines in either direction without the requirement of control signals to determine the direction the data should be travelling in.

Therefore the relatively small capacitance and wiring resistance of the segmented bus lines is quickly overcome by the local bi-directional bus amplifier circuits 200 and 202, increasing the bus line performance.

Figure 5:
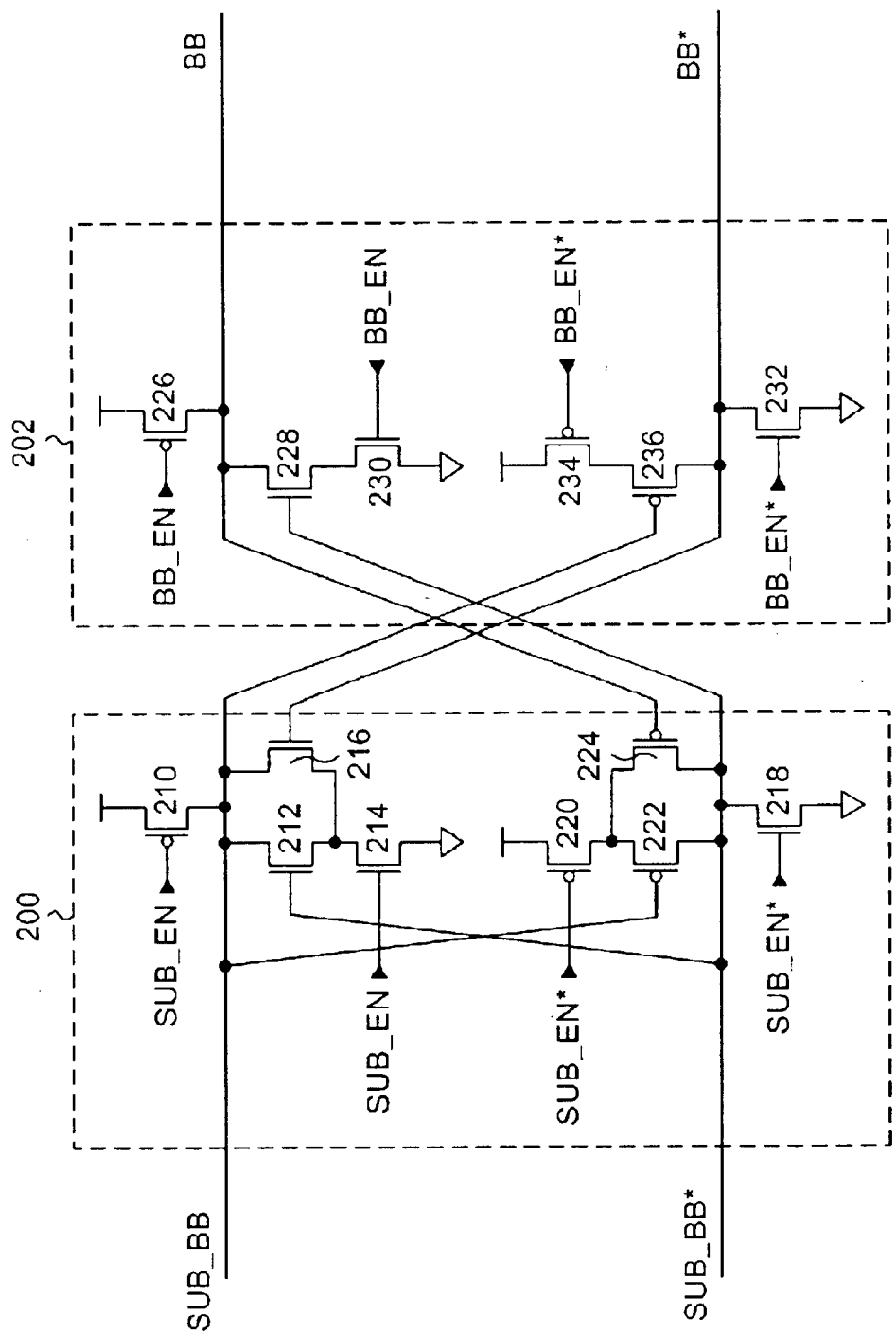
FIG. 5 is a circuit schematic of bi-directional amplifier circuits according to an embodiment of the present invention.

FIG. 5 is a circuit schematic embodiment of the local bi-directional bus amplifier circuits 200 and 202 shown in FIG. 4. Local bi-directional bus amplifier circuit 200 includes a discharge circuit for driving SUB_BB to VSS and a charge circuit for driving SUB_BB* to VDD. The discharge circuit includes p-channel precharge transistor 210, and n-channel discharge transistors 212, 214 and 216. Precharge transistor 210 receives the SUB_EN signal on its gate terminal, for coupling VDD to SUB_BB. Discharge transistors 212 and 214 are serially connected between SUB_BB and VSS, and discharge transistor 216 is coupled between SUB_BB and the shared source/drain terminal of transistors 212 and 214. The gate of transistor 212 is connected to SUB_BB*, the gate of transistor 214 receives SUB_EN, and the gate of transistor 216 is connected to BB*. The charge circuit includes n-channel precharge transistor 218, and p-channel charge transistors 220, 222 and 224. Precharge transistor 218 receives the SUB_EN* signal on its gate terminal, for coupling VSS to SUB_BB*. Charge transistors 220 and 222 are serially connected between VDD and SUB_BB*, and charge transistor 224 is coupled between the shared source/drain terminal of transistors 220 and 222 and SUB_BB*. The gate of transistor 220 receives SUB_EN*, the gate of transistor 222 is connected to SUB_BB, and the gate of transistor 224 is connected to BB.

Local bi-directional bus amplifier circuit 202 includes a discharge circuit for driving BB to VSS and a charge circuit for driving BB* to VDD. The discharge circuit includes p-channel precharge transistor 226, and n-channel discharge transistors 228 and 230. Precharge transistor 226 receives the BB_EN signal on its gate terminal, for coupling VDD to BB. Discharge transistors 228 and 230 are serially connected between BB and VSS, with their gates connected to SUB_BB* and BB_EN respectively. The charge circuit includes n-channel precharge transistor 232, and p-channel charge transistors 234 and 236. Precharge transistor 232 receives the BB_EN* signal on its gate terminal, for coupling VSS to BB*. Charge transistors 234 and 236 are serially connected between VDD and BB*, with their gates connected to BB_EN* and SUB_BB respectively.

The operation of the local bi-directional bus amplifier circuit 200 of FIG. 5, where a PE drives the sub-broadcast bus lines SUB_BB and SUB_BB* via its transceiver circuit now follows.

During the precharge phase, the SUB_EN is at the low logic level to precharge SUB_BB to VDD through precharge transistor 210, and SUB_BB* is pre-discharged to VSS through precharge transistor 218. Discharge transistor 214 disconnects SUB_BB from the VSS supply rail, and charge transistor 220 disconnects SUB_BB* from the VDD supply rail to inhibit current flow so that excessive power dissipation does not occur. Due to the cross-coupled connection of SUB_BB* to transistor 212 and the fact that SUB_EN is connected to precharge transistor 210 and discharge transistor 214, the precharge operation is not impeded because SUB_BB is not connected to both supply rails simultaneously. SUB_BB* has the same advantage for the discharge operation.

During the evaluation phase, the local bi-directional bus amplifier circuit 200 and transceiver circuits 204 are enabled through a high logic level of signal SUB_EN. If a zero is evaluated in any PEs' ALU, that PE will begin to pull down SUB_BB and pull up SUB_BB* through its transceiver circuit 204.

The local bi-directional bus amplifier circuit 200 works though a positive feedback mechanism on the pair of complementary bus lines SUB_BB and SUB_BB*. As SUB_BB is pulled down above the threshold voltage of the large PMOS transistor 222, transistor 222 turns on and augments the pull-up, or charging operation on SUB_BB*. Meanwhile, as SUB_BB* is pulled up past the threshold voltage of the large NMOS transistor 212, transistor 212 turns on and the pull down of SUB_BB is accelerated. This push-pull regenerative feedback continues until both SUB_BB and SUB_BB* swing to the supply rails as both devices of the cross-coupled transistor pair 212 and 222 are now activated.

Therefore, an evaluated zero on any of the sub-broadcast bus lines SUB_BB and SUB_BB* is preferably propagated to higher level broadcast bus lines BB and BB*, and then to all the other sub-broadcast bus lines.

The operation of the local bi-directional bus amplifier circuit 202 of FIG. 5, in response to the changing voltage levels of sub-broadcast bus lines SUB_BB and SUB_BB* now follows.

During the same precharge phase previously discussed for the local bi-directional bus amplifier circuit 200, BB_EN is at the low logic level. Both the SUB_EN and BB_EN can be the same or separate control signals depending on the application. BB is precharged to VDD through precharge transistor 226 and BB* is pre-discharged to VSS through precharge transistor 232. Furthermore, discharge transistor 230 disconnects BB from the VSS supply rail, and charge transistor 234 disconnects BB from the VDD supply rail to inhibit current flow and limit excessive power dissipation. As with SUB_BB and SUB_BB*, the precharge and pre-discharge operations are not impeded because BB and BB* are not connected to both supply rails simultaneously.

During the evaluation phase, BB_EN is set to the high logic level. Each of the sub-broadcast bus lines SUB_BB and SUB_BB* drive the gates of transistors 236 and 228 respectively. Thus, BB is pulled down and BB* is pulled up since current paths through transistors 228, 230 and 234, 236 are formed, and voltage reversal begins on SUB_BB and SUB_BB*.

Once the voltage reversal begins on BB and BB*, all of the remaining downstream sub-broadcast bus lines will begin voltage reversal in parallel upon activation of their respective local bi-directional amplifier circuits 200 via discharge and charge transistors 216 and 224. In this way, the bi-directional amplifier 106 is simultaneously bi-directional, since it logically connects two complementary pairs of bus lines, and actively drives the signal in either direction without prior knowledge of which direction the signal must be driven. Additionally, as voltage reversal begins on downstream sub-broadcast bus lines, cross-coupled transistors 212 and 222 will accelerate the voltage reversal even further.

Figure 6:
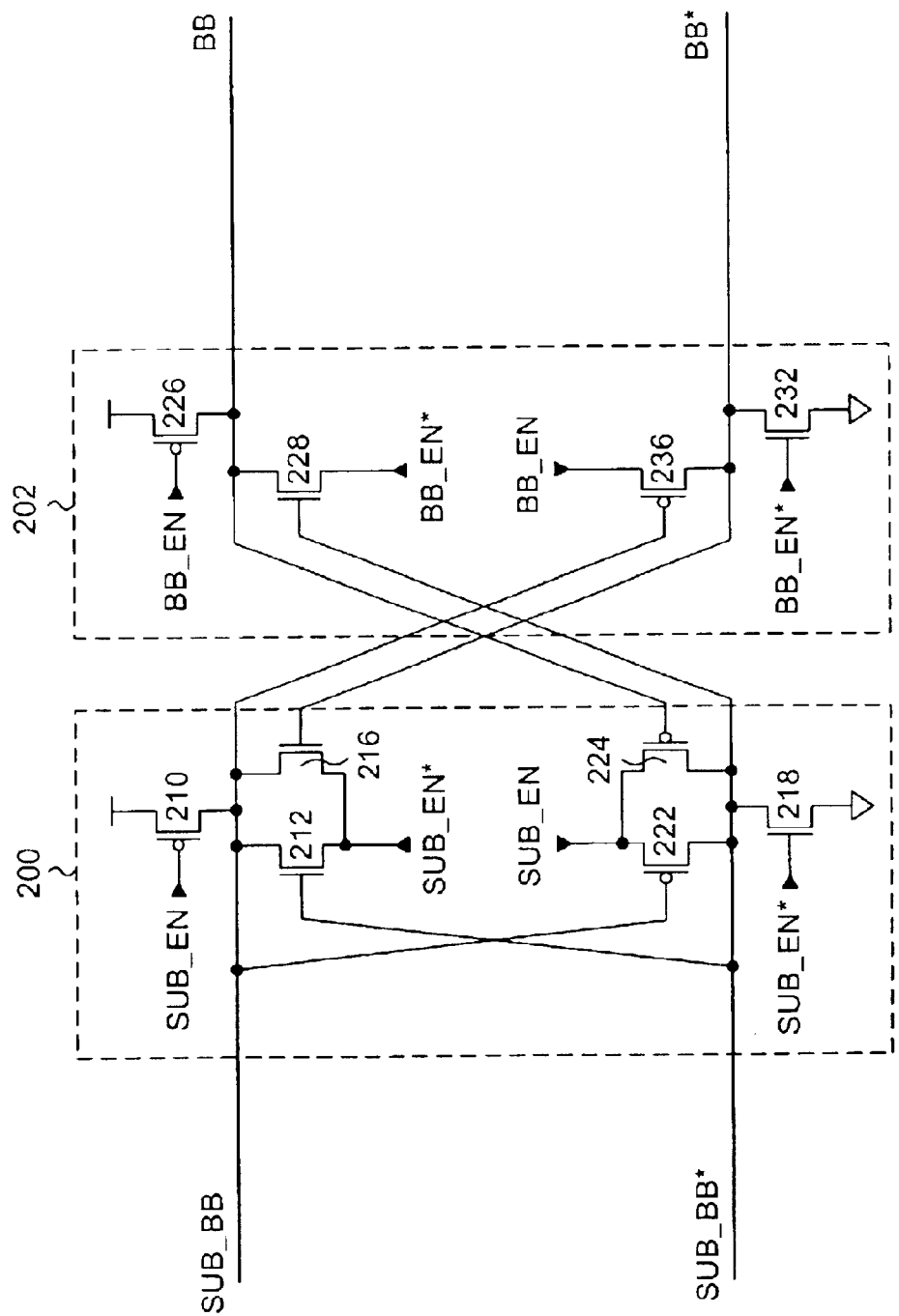
FIG. 6 is a circuit schematic of alternative bi-directional amplifier circuits according to an embodiment of the present invention.

An alternate circuit embodiment of the bi-directional bus amplifier 106 having a reduced transistor count is shown in FIG. 6. The presently shown circuit is substantially identical to the circuit shown in FIG. 5, where the same numbered transistors have been previously described with reference to FIG. 5. However, the discharge and charge circuits of local bi-directional bus amplifier circuits 200 and 202 no longer have discharge transistors 214, 230 and charge transistors 220, 234. In the present configuration, SUB_EN* is connected to the source terminal of discharge transistors 212 and 216, BB_EN* is connected to the source terminal of discharge transistor 228, SUB_EN is connected to the drain terminal of charge transistors 222 and 224, and BB_EN* is connected to the drain terminal of charge transistor 236. Thus the circuits that drive SUB_EN* and BB_EN* to VSS also discharge SUB_BB and BB to VSS during the evaluation phase of operation. Similarly, the circuits that drive SUB_EN and BB_EN to VDD also charge SUB_BB* and BB* to VDD during the evaluation phase of operation.

Figure 7:
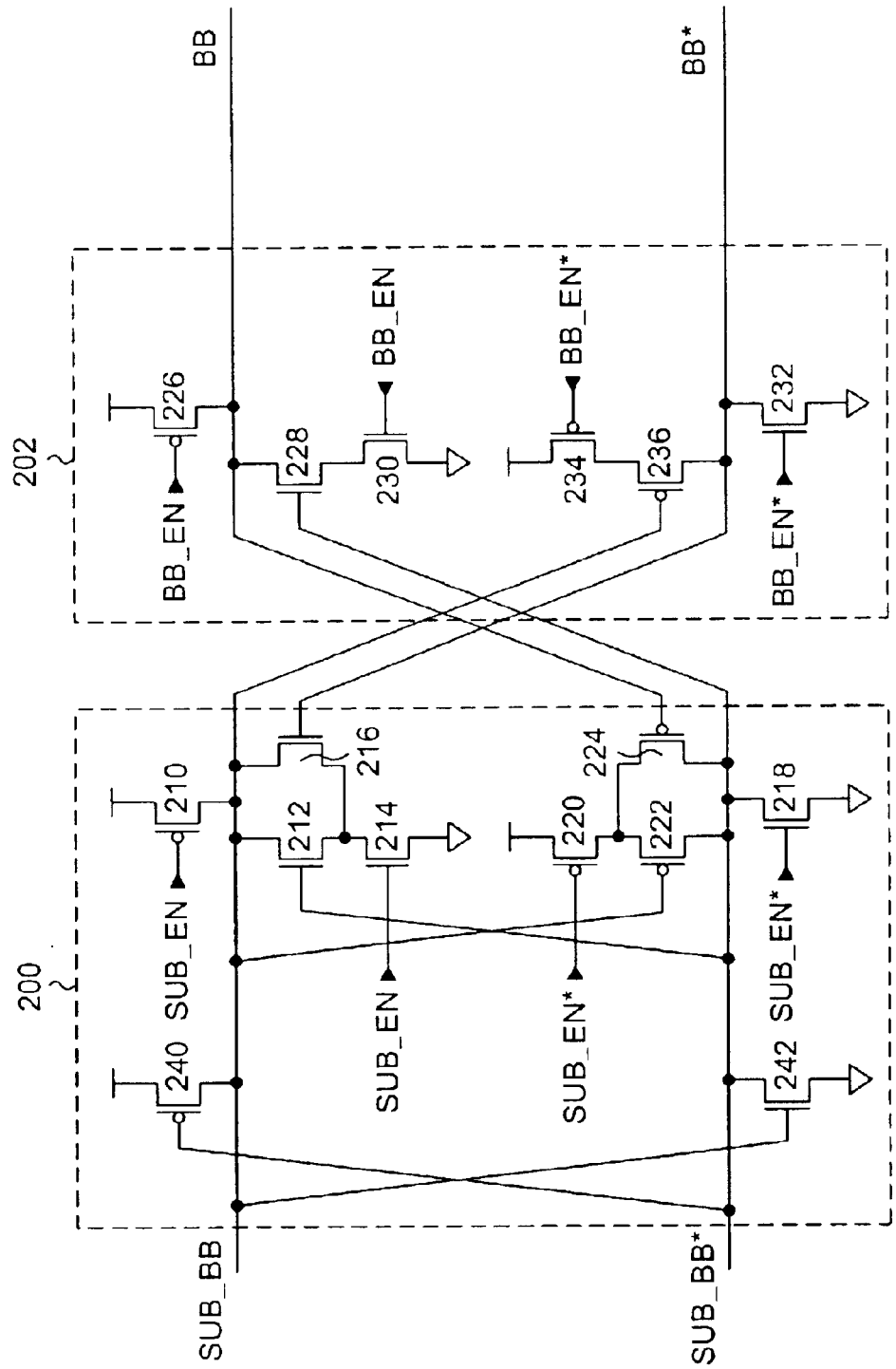
FIG. 7 is a circuit schematic of alternative bi-directional amplifier circuits according to an embodiment of the present invention.

An alternate circuit embodiment of the bi-directional bus amplifier 106 having increased noise tolerance is shown in FIG. 7. The presently shown circuit is identical to the circuit shown in FIG. 5, and includes the same numbered transistors previously described with reference to FIG. 5. However, increased noise tolerance of the dynamic nodes is achieved through the addition of weak keeper transistors 240 and 242. N-channel keeper transistor 240 can be a long channel device having its gate connected to SUB_BB* for coupling SUB_BB to VDD. P-channel keeper transistor 242 can be a long channel device having its gate connected to SUB_BB for coupling SUB_BB* to VSS. Of course, noise tolerance of the circuit shown in FIG. 6 can be improved by adding similar keeper transistors.

The local bi-directional bus amplifier circuits 202 shown in FIGS. 5, 6 and 7 do not accelerate charge reversal of short broadcast bus lines BB and BB*. This is due to the fact that their local bi-directional bus amplifier circuits 202 do not employ a positive feedback mechanism for driving BB and BB* to the low and high logic levels respectively. However, those of skill in the art would understand that application of the previously disclosed local bi-directional bus amplifier circuits 200 to bus lines BB and BB* provides a robust bi-directional bus line amplification scheme.

Figure 8:
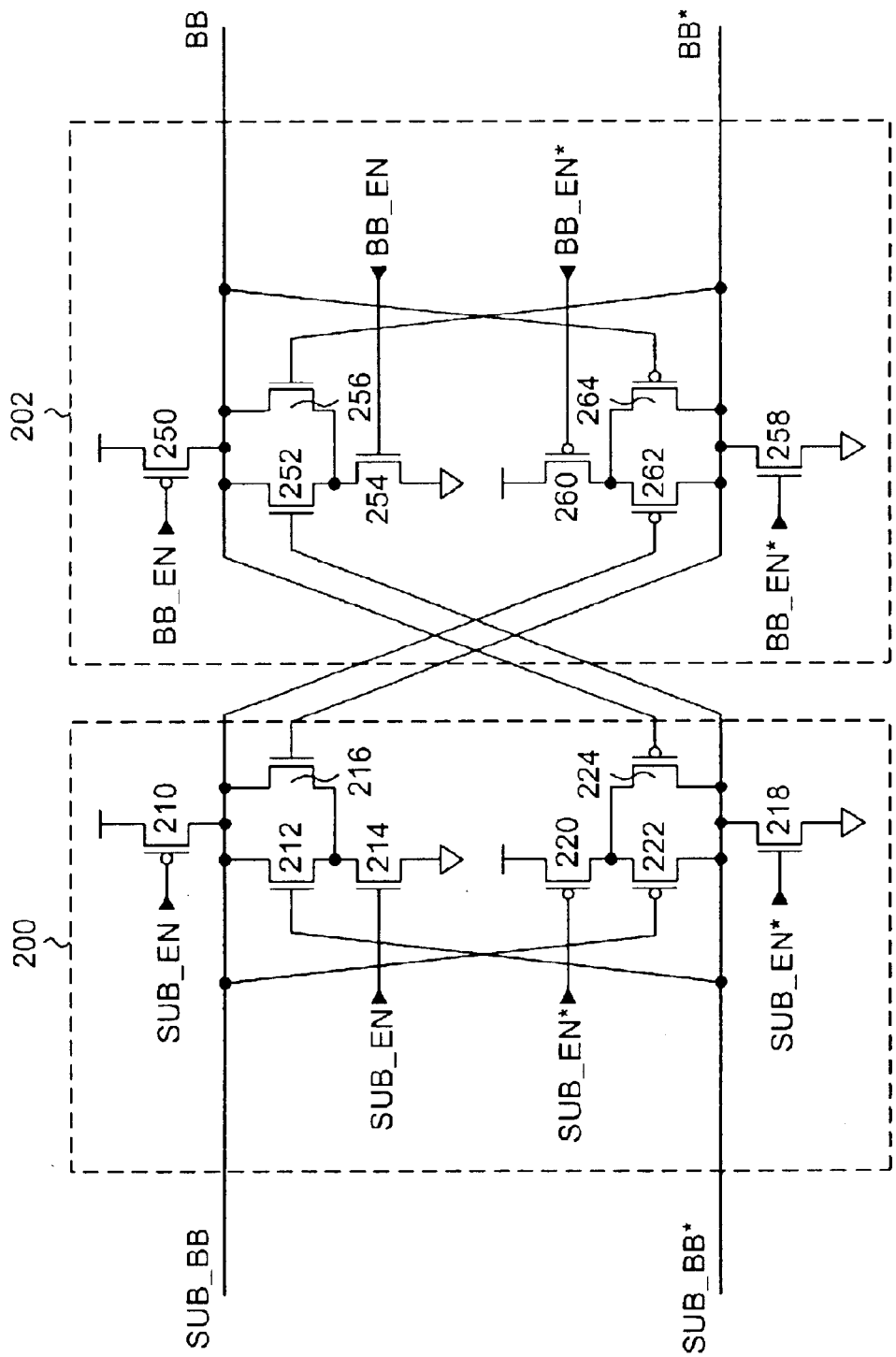
FIG. 8 is a circuit schematic of alternative bi-directional amplifier circuits according to an embodiment of the present invention.

FIG. 8 shows a circuit embodiment of the bi-directional bus amplifier 106 for simultaneous amplification of signals in both directions of the sub-broadcast bus lines and the short broadcast bus lines. The presently shown circuit is substantially identical to the circuit shown in FIG. 5, where the same numbered transistors have been previously described with reference to FIG. 5. More specifically, local bi-directional bus amplifier circuit 200 is identical to local bi-directional bus amplifier circuit 200 shown in FIG. 5. However, to provide full bi-directional bus line amplification across bus lines SUB_BB/SUB_BB* and bus lines BB/BB*, the bi-directional bus amplifier circuit 202 of FIG. 8 uses the same bi-directional bus amplifier circuit 200 of FIG. 5.

In FIG. 8, bi-directional bus amplifier circuit 202 includes a discharge circuit for driving BB to VSS and a charge circuit for driving BB* to VDD. The discharge circuit includes p-channel precharge transistor 250, and n-channel discharge transistors 252, 254 and 256. Precharge transistor 250 receives the BB_EN signal on its gate terminal, for coupling VDD to BB. Discharge transistors 252 and 254 are serially connected between BB and VSS, and discharge transistor 256 is coupled between BB and the shared source/drain terminal of transistors 252 and 254. The gate of transistor 252 is connected to SUB_BB*, the gate of transistor 254 receives BB_EN, and the gate of transistor 256 is connected to BB*. The charge circuit includes n-channel precharge transistor 258, and p-channel charge transistors 260, 262 and 264. Precharge transistor 258 receives the BB_EN* signal on its gate terminal, for coupling VSS to BB*. Charge transistors 260 and 262 are serially connected between VDD and BB*, and charge transistor 264 is coupled between the shared source/drain terminal of transistors 260 and 262 and BB*. The gate of transistor 260 receives BB_EN*, the gate of transistor 262 is connected to SUB_BB, and the gate of transistor 264 is connected to BB.

The operation of the bi-directional bus amplifier circuit 200 of FIG. 8 is identical to that of the same circuit previously described for FIG. 5. The amplifying operation of bus lines BB and BB* by bi-directional bus amplifier circuit 202 of FIG. 8 is the same as the amplifying operation of bus lines SUB_BB and SUB_BB* by local bi-directional bus amplifier circuit 200. In another alternate embodiment, the keeper transistors shown in FIG. 7 can be added to one or both pairs of complementary bus lines.

Alternate circuit embodiments for bi-directional amplifier circuit 106 can be obtained by combining together any of the previously disclosed local bi-directional bus amplifier circuits shown in FIGS. 5 to 7. The high speed bus amplifier architecture of the present embodiments can be applied three or more levels of bus hierarchy, instead of two.

In the high-speed bi-directional bus line architecture embodiments shown in FIGS. 3 and 4, the precharged logic level of the sub-broadcast bus lines 104 and short broadcast bus lines 102 serves as one data level while their charge reversed logic level serves as the other data level for data communication. Thus transceiver circuits designed for this architecture are required. In particular, circuit embodiments of transceiver circuit 204 of FIG. 4 are now described.

FIG. 9 shows a circuit schematic of transceiver 204 of FIG. 4 that each PE 30 uses to write to and read from the sub-broadcast bus lines SUB_BB and SUB_BB*. Transceiver 204 includes a transmit circuit and a receive circuit. The transmit circuit consists of NAND gate 300, inverter 302, n-channel discharge transistor 304 and p-channel charge transistor 306. NAND gate 300 receives enable signal SUB_EN and PE 30 data DATA_OUT, and drives the input of inverter 302 and the gate of transistor 306. The output of inverter 302 drives the gate of transistor 304. The receive circuit consists of NAND gate 308, which has one input connected to receive SUB_BB* and another input for receiving SUB_EN.

In operation, it is assumed that SUB_EN was set to the low logic level for precharging all the sub-broadcast bus lines and short broadcast bus lines via the local bi-directional bus amplifier precharge circuits shown in the previous figures. Hence SUB_BB and SUB_BB* are set to the high and low logic levels respectively during the precharge phase. The circuit is enabled, or activated for operation, when SUB_EN is set to the high logic level. For transmitting a logic "0" bit of data, DATA_OUT is at the logic "0" level and transistors 304 and 306 remain turned off since NAND gate 300 drives a logic "1" level. Hence the precharged levels of SUB_BB and SUB_BB* represent the DATA_OUT logic level. For transmitting a logic "1" bit of data, DATA_OUT is at the logic "1" level. NAND gate 300 then drives a "0" logic level to turn on transistor 304 via inverter 302, and transistor 306, to initiate charge reversal of SUB_BB and SUB_BB*. It is noted that while SUB_EN is at the high logic level, all the local bi-directional bus line amplifier circuits are enabled for accelerating charge reversal of the bus lines they are connected to.

In a first alternative circuit embodiment of transceiver 204 shown in FIG. 9, inverter 302 can be removed and n-channel transistor 304 can be replaced with a p-channel transistor, such that the output of NAND gate 300 is connected directly to its gate.

In a second alternative circuit embodiment of transceiver 204 shown in FIG. 9, p-channel transistor 306 can be replaced by and n-channel transistor and NAND gate 300 can be replaced by an AND gate. The use of an AND gate removes the need for inverter 302.

According to another embodiment of the present invention, the sub-broadcast buses 104 in each bank of CRAM 100 shown in FIG. 3 can replaced by a hierarchy of sub-broadcast buses with transceiver circuits coupling buses of different levels to each other, for increasing bus line performance.

For example, the length of each sub-broadcast bus 104 in FIG. 3 can be shortened and coupled to a pair of small sub-broadcast bus segments positioned between it and the PEs 30. The first small sub-broadcast bus segment is coupled a first half of the PEs 30 through their respective transceivers, and the second small sub-broadcast bus segment is coupled to the second half of the PEs 30 through their respective transceivers. Bi-directional transceivers can be used to couple data between each small sub-broadcast bus segment and the sub-broadcast bus.

FIG. 10 illustrates a circuit embodiment of a bi-directional transceiver for coupling data between two buses. The bi-directional transceiver includes a transmit circuit and a receive circuit coupled between small sub-broadcast bus lines SSUB_BB, SSUB_BB* and sub-broadcast bus lines SUB_BB, SUB_BB*. The transmit circuit consists of NAND gate 400, inverter 402, n-channel discharge transistor 404 and p-channel charge transistor 406. NAND gate 400 receives enable signal SUB_EN and SSUB_BB*, and drives the input of inverter 402 and the gate of transistor 406. Transistor 404 couples SUB_BB to VSS and transistor 406 couples SUB_BB* to VDD. The output of inverter 402 drives the gate of transistor 404. The receive circuit consists of NAND gate 408, inverter 410, n-channel discharge transistor 412 and p-channel charge transistor 414. NAND gate 408 receives enable signal SUB_EN and SUB_BB*, and drives the input of inverter 410 and the gate of transistor 414. Transistor 412 couples SSUB_BB to VSS and transistor 414 couples SSUB_BB* to VDD. The output of inverter 410 drives the gate of transistor 412. It is noted that the transmit and receive circuits have the same components and configuration as the transmit circuit shown in FIG. 9. The transmit and receive circuits are arranged in a cross-coupled configuration between SSUB_BB, SSUB_BB* and SUB_BB, SUB_BB*. The operation of the transmit and receive circuits shown in FIG. 10 is therefore the same as previously described for the transmit circuit of FIG. 9, and hence does not require further description.

While the embodiments of the high-speed bi-directional bus line architecture have been applied to sub-broadcast buses and broadcast buses on a CRAM device, they are equally effective for application to an off-chip bus. If for example, complementary bus lines are available on a printed circuit board, then the local bi-directional bus amplifier circuits shown in FIGS. 5 to 8 can be implemented with widely available discrete transistor components to improve off-chip bus performance.

If a single ended bus line is available off-chip, then external pull up resistors can be coupled to the external bus line and multiple integrated circuits can be connected together to share the external bus line in a higher level of the bus hierarchy via single ended interface circuits.

Figure 11:
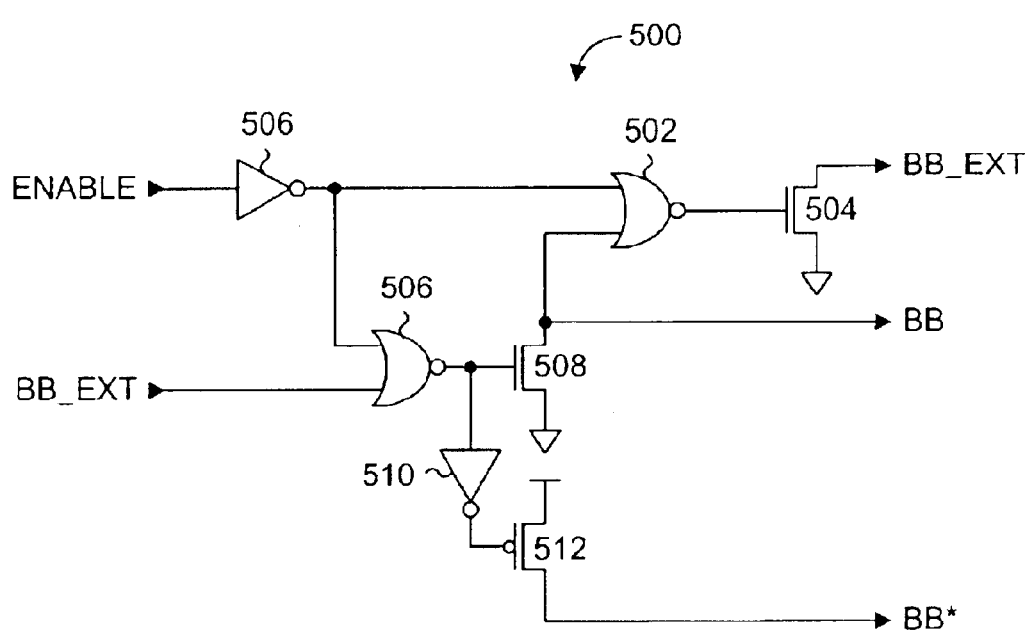

An embodiment of a single ended bus interface circuit for single ended off-chip bus lines is shown in FIG. 11. Because multiple CRAM chips can be connected to a common external broadcast bus, the single ended bus interface circuit is preferably included in each chip. According to the present embodiment, the off-chip bus is precharged to a logic "1" level and the internal small broadcast bus lines BB and BB* are precharged to the logic "1" and "0" levels respectively. The off-chip bus can be precharged to the logic "1" level using the precharge circuits shown in FIGS. 5 to 8, or any technique known to those of skill in the art. Bus lines BB and BB* can be precharged using the local bi-directional bus amplifier circuits shown in FIGS. 5 to 8. Bus interface circuit 500 includes a transmit circuit for driving data from the integrated circuit to the off-chip bus, and a receive circuit for receiving data from the off-chip bus and driving the internal bus of the integrated circuit. The transmit circuit consists of NOR gate 502 having an output driving the gate of n-channel discharge transistor 504. NOR gate 502 has one input connected to the output of inverter 506 and a second input connected to internal bus BB, while transistor 504 is coupled between the external bus BB_EXT and VSS. The input of inverter 506 receives enable signal ENABLE. The receive circuit consists of NOR gate 508, n-channel discharge transistor 508, inverter 510, and p-channel charge transistor 512. NOR gate 508 has one input connected to the output of inverter 506, a second input connected to external bus BB_EXT, and an output for driving the gate of transistor 508 and the input of inverter 510. The output of inverter 510 drives the gate of transistor 512. Transistor 508 couples BB to VSS, and transistor 512 couples BB* to VDD.

In operation, both the transmit and receive circuits are activated when ENABLE is at the high logic level to set the first inputs to NOR gates 502 and 506 to the low logic level via inverter 506. ENABLE can be separately controlled from SUB_EN that enable the local bi-directional bus amplifier circuits previously shown, or it can be the same as SUB_EN if desired. Transmitting a logic "1" of BB to BB_EXT is immediate because the output of NOR gate 502 remains at the low logic level to keep discharge transistor 504 turned off. Hence BB_EXT uses the precharge "1" level as the data value. To transmit a logic "0" of BB to BB_EXT, NOR gate 502 drives the gate of discharge transistor 504 to the high logic level in response to the logic "0" level of BB. Thus discharge transistor 504 is turned on for discharging BB_EXT to VSS.

Receiving a logic "1" of BB_EXT does not reverse the charge of BB and BB* since NOR gate 506 drives the gate of transistor 508 to a low logic level, and the gate of transistor 512 to a high logic via inverter 510. However, receiving a logic "0" of BB_EXT at NOR gate 506 turns on transistors 508 and 512 to initiate charge reversal of BB and BB*.

In an alternative circuit embodiment of the single ended bus interface circuit shown in FIG. 11, p-channel charge transistor 512 can be replaced by an n-channel transistor. As a result, the component count for the circuit is reduced because inverter 510 is no longer needed.

In an alternative high speed bi-directional bus amplifier architecture, multiple local bi-directional bus amplifier circuits can be distributed along the length of each bus segment to further minimize its effective resistance, and the data receive circuit of the transceiver can be modified for connection to either or both of the complementary sub-broadcast bus lines. The bus transceiver can be constructed with well known logic gate circuits in a configuration that performs the same function as those disclosed in the figures. Both the bus amplifier and bus transceiver circuits can be made to operate in a uni-directionally through circuit modifications known to those of skill in the art.

While the embodiments of the present invention have been discussed in relation to CRAM architectures, they can be equally applied to other parallel processor in memory architectures, or systems requiring long bus lines.

The above-described embodiments of the invention are intended to be examples of the present invention. Alterations, modifications and variations may be effected the particular embodiments by those of skill in the art, without departing from the scope of the invention which is defined solely by the claims appended hereto.

What is claimed is:

1. A bi-directional amplifier circuit for driving data between first and second complementary bus lines and third and fourth complementary bus lines, comprising:

a precharge circuit for charging the first bus line to a high logic level;

a pre-discharge circuit for discharging the second bus line to a low logic level;

a discharge circuit for driving the first bus line to the low logic level in response to a change in the logic level of one of the second bus line and the fourth bus line; and, a charge circuit for driving the second bus line to the high logic level in response to a change in the logic level of one of the first bus line and the third bus line.

2. The bi-directional amplifier circuit of claim 1, wherein an enable signal activates the discharge circuit and disables the pre-discharge circuit, and an inverted enable signal activates the charge circuit and disables the discharge circuit.

3. The bi-directional amplifier circuit of claim 2, wherein the precharge circuit includes a p-channel transistor having a gate terminal for receiving the enable signal, and the pre-discharge circuit includes an n-channel transistor having a gate terminal for receiving the inverted enable signal.

4. The bi-directional amplifier circuit of claim 3, wherein the discharge circuit includes a first discharge transistor for discharging the first bus line to the low logic level in response to the high logic level of the fourth bus line, and the charge circuit includes a first charge transistor for charging the second bus line to the high logic level in response to the low logic level of the third bus line.

5. The bi-directional amplifier circuit of claim 4, wherein the discharge circuit includes second and third discharge transistors serially connected between the first bus line and VSS, the second discharge transistor having a gate terminal for receiving the second bus line, the third discharge transistor having a gate terminal for receiving the enable signal, and the charge circuit includes second and third charge transistors serially connected between the second bus line and VDD, the second charge transistor having a gate terminal for receiving an inverted enable signal, the third charge transistor having a gate terminal for receiving the first bus line.

6. The bi-directional amplifier circuit of claim 5, further including a first keeper transistor having a gate terminal connected to the second bus line for coupling VDD to the first bus line, and a second keeper transistor having a gate terminal connected to the first bus line for coupling the second bus line to VSS.

7. The bi-directional amplifier circuit of claim 4, wherein
the discharge circuit includes a second discharge transistor connected between the first bus line and the enable signal, the second discharge transistor having a gate terminal for receiving the second bus line, and
the charge circuit includes a second charge transistor connected between the second bus line and the inverted enable signal, the second charge transistor having a gate terminal for receiving the first bus line.

8. The bi-directional amplifier circuit of claim 1, further including
a first keeper transistor having a gate terminal connected to the second bus line for coupling VDD to the first bus line, and a second keeper transistor having a gate terminal connected to the first bus line for coupling the second bus line to VSS.

9. The bi-directional amplifier circuit of claim 1, wherein multiple discharge and charge circuits are coupled to the first and second bus lines.

10. A bi-directional amplifier circuit for driving data between first and second complementary bus lines, and third and fourth complementary bus lines, the first and third bus lines being precharged to a first predetermined logic level and the second and fourth bus lines being precharged to a second predetermined logic level, comprising:
a first local bi-directional amplifier circuit coupled to the first and second complementary bus lines for receiving the third and fourth complementary bus lines, the first local bi-directional amplifier circuit accelerating charge reversal of the first and second complementary bus lines in response to a change in the logic levels of one of the third and fourth complementary bus lines and the first and second complementary bus lines; and,
a second local bi-directional amplifier circuit coupled to the third and fourth complementary bus lines for receiving the first and the second bus lines, the second local bi-directional amplifier circuit accelerating charge reversal of the third and fourth complementary bus lines in response to a change in the logic levels of one of the first and second complementary bus lines and the third and fourth complementary bus lines.

11. The bi-directional amplifier circuit of claim 10, wherein the first local bi-directional amplifier circuit includes
a precharge circuit for precharging the first bus line to the first predetermined logic level;
a pre-discharge circuit for precharging the second bus line to the second predetermined logic level;
a discharge circuit for driving the first bus line to the second predetermined logic level in response to a change in the logic level of one of the second bus line and the fourth bus line; and,
a charge circuit for driving the second bus line to the first predetermined logic level in response to a change in the logic level of one of the first bus line and the third bus line.

12. The bi-directional amplifier circuit of claim 11, wherein the precharge circuit includes a p-channel transistor having a gate terminal for receiving the enable signal, and the pre-discharge circuit includes an n-channel transistor having a gate terminal for receiving an inverted enable signal.

13. The bi-directional amplifier circuit of claim 12, wherein
the discharge circuit includes a first discharge transistor for discharging the first bus line to the low logic level in response to the high logic level of the fourth bus line, and
the charge circuit includes a first charge transistor for charging the second bus line to the high logic level in response to the low logic level of the third bus line.

14. The bi-directional amplifier circuit of claim 13, wherein
the discharge circuit includes second and third discharge transistors serially connected between the first bus line and VSS, the second discharge transistor having a gate terminal for receiving the second bus line, the third discharge transistor having a gate terminal for receiving the enable signal, and
the charge circuit includes second and third charge transistors serially connected between the second bus line and VDD, the second charge transistor having a gate terminal for receiving the inverted enable signal, the third charge transistor having a gate terminal for receiving the first bus line.

15. The bi-directional amplifier circuit of claim 10, further including
a first keeper transistor having a gate terminal connected to the second bus line for coupling VDD to the first bus line, and
a second keeper transistor having a gate terminal connected to the first bus line for coupling the second bus line to VSS.

16. A method of bi-directionally driving data between first and second complementary bus lines and third and fourth complementary bus lines, comprising:
a) precharging the first and third complementary bus lines to a first predetermined logic level;
b) precharging the second and fourth complementary bus lines to a second predetermined logic level;
c) changing the first precharged bus line to the second predetermined logic level in response to a change in the logic level of one of the second bus line and the fourth bus line; and,
d) changing the second precharged bus line to the first predetermined logic level in response to a change in the logic level of one of the first bus line and the third bus line.

17. The method of claim 16, wherein the step of precharging includes precharging the first and third bus lines to the high logic level, and pre-discharging the second and fourth bus lines to the low logic level.

18. The method of claim 16, wherein the step of precharging is initiated by an inactive level of an enable signal.

19. The method of claim 18, wherein the step of discharging and charging is initiated by an active level of the enable signal.

20. A computational random access memory having a plurality of memory columns comprising:
processing elements associated with the memory columns for executing computational functions;
a complementary pair of sub-broadcast bus lines for receiving input data from processing elements and for providing output data to the processing elements;
a complementary pair of short broadcast bus lines for receiving the input data from the complementary pair of sub-broadcast bus lines and providing the output data to the complementary pair of sub-broadcast bus lines; and, a bi-directional bus amplifier circuit for accelerating charge reversal of the complementary pairs of sub-broadcast bus lines and short broadcast bus lines.

21. The computational random access memory of claim 20, wherein each processing element includes a transceiver circuit for providing the input data to the complementary pair of sub-broadcast bus lines and receiving the output data from the complementary pair of sub-broadcast bus lines.

22. The computational random access memory of claim 21, wherein the transceiver circuit includes a receive circuit for receiving the input data from one sub-broadcast bus line of the complementary pair of sub-broadcast bus lines, and a transmit circuit for driving the complementary pair of sub-broadcast bus lines with the output data.

23. The computational random access memory of claim 22, wherein the receive circuit includes a first NAND gate having one input connected to the one sub-broadcast bus line and a second input for receiving an enable signal.

24. The computational random access memory of claim 23, wherein the transmit circuit includes a second NAND gate having one input for receiving the enable signal and a second input for receiving the output data, the second NAND gate providing an activation signal, a drive circuit for driving the complementary pair of sub-broadcast bus lines to complementary logic levels corresponding to the output data in response to the activation signal.

25. The computational random access memory of claim 24, wherein the drive circuit includes an inverter for receiving the activation signal and providing an inverted activation signal, a p-channel transistor for coupling the one sub-broadcast bus line to VDD in response to the activation signal, and an n-channel transistor for coupling the other sub-broadcast bus line to VSS in response to the inverted activation signal.

* * * * *